US010336277B2

(12) United States Patent
Kubiak et al.

(10) Patent No.: US 10,336,277 B2
(45) Date of Patent: Jul. 2, 2019

(54) SYSTEMS FOR RIDE VEHICLE RESTRAINT

(71) Applicant: Universal City Studios LLC, Universal City, CA (US)

(72) Inventors: Gerald Christopher Kubiak, Huntington Beach, CA (US); James Jeffrey Coatney, Los Angeles, CA (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 15/812,910

(22) Filed: Nov. 14, 2017

(65) Prior Publication Data

US 2018/0339672 A1    Nov. 29, 2018

Related U.S. Application Data

(60) Provisional application No. 62/510,850, filed on May 25, 2017.

(51) Int. Cl.
| | | |
|---|---|---|
| *B60R 21/055* | (2006.01) | |
| *A63G 7/00* | (2006.01) | |
| *B60R 11/02* | (2006.01) | |
| *B60R 21/02* | (2006.01) | |
| *B60R 11/00* | (2006.01) | |
| *B60R 21/00* | (2006.01) | |

(52) U.S. Cl.
CPC .............. *B60R 21/055* (2013.01); *A63G 7/00* (2013.01); *B60R 11/0235* (2013.01); *B60R 11/0241* (2013.01); *B60R 21/02* (2013.01); *B60R 2011/0075* (2013.01); *B60R 2021/0097* (2013.01); *B60R 2021/0213* (2013.01)

(58) Field of Classification Search
CPC ....... B60R 21/00; B60R 21/04; B60R 21/055; B60R 21/14; B60N 2/00; B60N 2/3084; A63G 31/00; A63G 31/02; A63G 31/16
USPC ....... 472/43, 59–61, 130; 280/748, 751, 752
See application file for complete search history.

(56) References Cited

U.S. PATENT DOCUMENTS

| | | | |
|---|---|---|---|
| 4,795,209 A | 1/1989 | Quinlan, Jr. et al. | |
| 4,900,086 A | 2/1990 | Steward | |
| 4,986,600 A * | 1/1991 | Leblanc | B60N 2/3084 297/112 |
| 5,238,265 A | 8/1993 | Duce | |

(Continued)

FOREIGN PATENT DOCUMENTS

| | | |
|---|---|---|
| CA | 1243930 A | 11/1988 |
| EP | 1618933 A1 | 1/2006 |

(Continued)

OTHER PUBLICATIONS

PCT International Search Report & Written Opinion; PCT Application No. PCT/US2018/033748; dated Oct. 17, 2018.

*Primary Examiner* — Kien T Nguyen
(74) *Attorney, Agent, or Firm* — Fletcher Yoder, P.C.

(57) ABSTRACT

A system includes a first cummerbund that includes a slot. Furthermore, the system includes a lap bar that couples to first and second pivot points and rotates in a first circumferential direction about the first and second pivot points. The lap bar extends through the slot of the first cummerbund such that the first cummerbund translates in a first lateral direction relative to the lap bar to adjust a position of the lap bar within the slot.

20 Claims, 5 Drawing Sheets

(56) References Cited

U.S. PATENT DOCUMENTS

| | | | |
|---|---|---|---|
| 5,833,267 A * | 11/1998 | Cordes | B60R 22/14 |
| | | | 280/751 |
| 7,185,909 B2 | 3/2007 | Espenshade et al. | |
| 8,025,581 B2 | 9/2011 | Bryan et al. | |
| 2016/0114749 A1 | 4/2016 | Howard | |
| 2017/0345198 A1 | 11/2017 | Magpuri et al. | |

FOREIGN PATENT DOCUMENTS

| | | |
|---|---|---|
| EP | 3213800 A1 | 9/2017 |
| FR | 2 989 342 A1 | 10/2013 |
| WO | 2013187235 A1 | 12/2013 |

\* cited by examiner und and second position. Furthermore, the lap bar ...

SYSTEMS FOR RIDE VEHICLE RESTRAINT

CROSS-REFERENCE TO RELATED APPLICATIONS

The present application claims priority to U.S. Provisional Application No. 62/510,850, entitled "Systems and Methods for Ride Vehicle Restraint," filed May 25, 2017, which is incorporated by reference in its entirety herein for all purposes.

BACKGROUND

The present disclosure relates generally to amusement park-style rides, and more specifically to systems for securing guests inside a ride vehicle of the amusement park-style rides.

Most amusement park-style rides include ride vehicles that carry passengers along a ride path, for example a track. Over the course of the ride, the ride path may include a number of features, including tunnels, turns, ups, downs, loops, and so forth. Even though a an typical amusement park ride that includes a combination of these and other features may only last a few minutes, while the guests are inside the operating ride, they may be subject to forces while the ride is in operation. Further, guests of vastly different shapes and sizes (e.g., a parent and their child) may wish to sit next to one another in the ride vehicle. Accordingly, it is now recognized that it is desirable to simultaneously restrain differently sized guests while the ride is in operation.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a system includes a first cummerbund that includes a slot. Furthermore, the system includes a lap bar that couples to first and second pivot points and to rotates in a first circumferential direction about the first and second pivot points, such that the lap bar extends through the slot of the first cummerbund, and such that the first cummerbund is translates in a first lateral direction relative to the lap bar to adjust a position of the lap bar within the slot.

In another embodiment, a ride system includes a ride vehicle that includes a lap bar that couples to first and second pivot points of the ride vehicle, such that the lap bar rotates in a first circumferential direction about the first and second pivot points. Furthermore, the ride vehicle includes many cummerbunds disposed about the lap bar, such that each cummerbund includes a slot. In addition, the lap bar extends through the slot of each cummerbund, and the many cummerbunds translate independently of one another in a first lateral direction relative to the lap bar to adjust a corresponding position of the lap bar within the slot.

In yet another embodiment, a ride vehicle includes a cummerbund that includes a slot, such that the cummerbund contacts a ride passenger. In addition, the ride vehicle includes a lap bar that couples to first and second pivot points of the ride vehicle and rotates in a first circumferential direction about the first and second pivot points between a first position and second position. Furthermore, the lap bar extends through the slot of the cummerbund, and the cummerbund translates in a lateral direction relative to the lap bar between a third position and a fourth position.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Typical amusement park ride systems (e.g., roller coasters or dark rides) include one or more ride vehicles that follows a ride path (e.g., a track) through a series of features. Such features may include tunnels, turns, ups, downs, loops, and the like. Because the ride vehicles often travel at high speeds and traverse along non-linear paths, guests riding inside the ride vehicles may experiences strong forces that may move (e.g., jerk) the guest if the guest is not secured within the ride vehicle. Further, guests of vastly different sizes and shapes, such as a tall parent and a small child, may wish to sit next to one another inside the ride vehicle. Accordingly, it may be desirable for the ride vehicle to be able to simultaneously secure guests of a wide range of shapes and sizes.

By using the systems and techniques described herein to restrain (e.g., secure) passengers of varying body types and sizes in a moving or stationary ride vehicle, the adaptability of the ride system to variability in body types of the ride passengers, and the efficiency in securing the ride passengers to the ride vehicle may be improved. By improving the ability of the ride vehicle to simultaneously accommodate guests of a wide spectrum of shapes and sizes, access to the ride system may be expanded without having to separate groups of guests (e.g., families) that would prefer to enjoy the ride system together.

Figure 1:
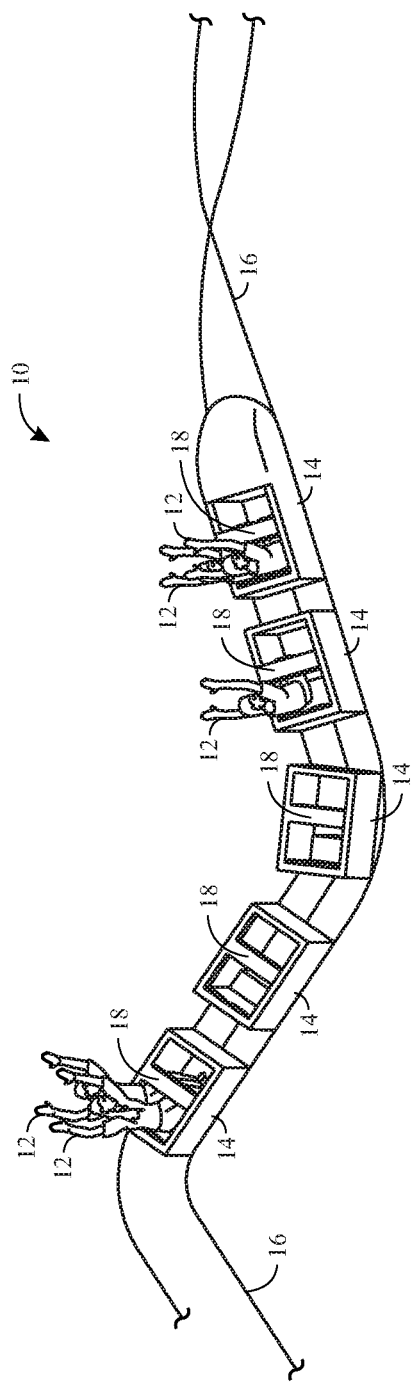
FIG. 1 is a side perspective view of an embodiment of a ride system, in accordance with aspects of the present disclosure.

FIG. 1 is a perspective view one embodiment of a ride system 10. The ride system 10 may include one or more ride vehicles 14 that hold one or more passengers 12. In an embodiment, multiple ride vehicles 14 may be coupled together (e.g., by a linkage). The ride vehicle 14 travels along a ride path 16. The ride path 16 may be any surface on which the ride vehicle 14 travels. In an embodiment, the ride path 16 may be defined by a track. The ride path 16 may or may not dictate the path traveled by the ride vehicle 14. That is, in an embodiment, the ride path 16 may control the movement (e.g., direction, speed, and/or orientation) of the ride vehicle 14 as it progresses, similar to a train on train tracks.

In an embodiment, there may be a system for controlling the path taken by the ride vehicle 14. For example, the ride path 16 may be an open surface that allows the passengers 12 to control certain aspects of the movement of the ride vehicle 14 via an interface system resident on the ride vehicle 14.

Furthermore, the ride system 10 may include ride vehicles 14 that may accommodate any number of ride passengers 12. For example, the illustrated embodiment includes five ride vehicles 14 that may each accommodate two ride passengers 12. However, it should be understood that the ride system 10 may include any number of ride vehicles 14. For example, the ride system 10 may include two, four, ten, twenty, etc., or any number of ride vehicles 14, such that each ride vehicle 14 may accommodate any number of passengers 12. For example, a first ride vehicle 14 may accommodate two passengers, a second ride vehicle 14 may accommodate four passengers 12, a third ride vehicle 14 may accommodate six passengers 12, and any further ride vehicles 14 may accommodate any number of passengers 12.

As illustrated and as discussed in detail below, the ride vehicle 14 may include a restraining system 18 that, in an embodiment, may be removably fixed to one or both lateral sides of the ride vehicle 14. Furthermore, the restraining system 18 may be positioned above the lap of a passenger 12, such that the restraining system 18 may contact the lap of the passenger 12, thereby securing the passenger 12 to the ride vehicle 14.

Figure 2:
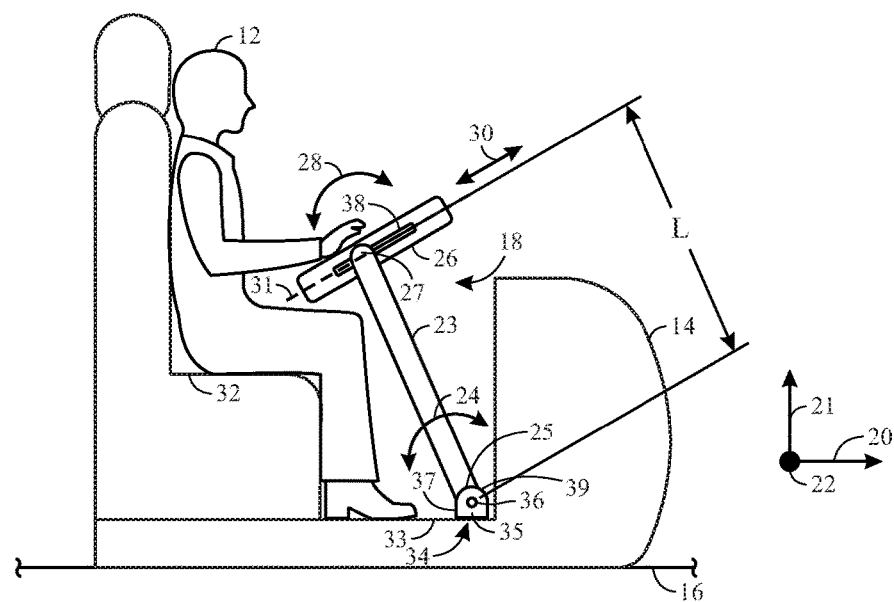
FIG. 2 is a side view of an embodiment of a ride vehicle of the ride system of FIG. 1, in accordance with aspects of the present disclosure.

FIG. 2 is side view of an embodiment of the ride vehicle 14 of the ride system 10, which includes a restraining system 18. The ride vehicle 14 may travel along the ride path 16 in a direction of travel 20. Furthermore, to aid in describing the position of certain illustrated features, a coordinate system is included. The coordinate system includes the forward direction of travel 20, an upward direction 21, and a lateral direction 22. In the illustrated embodiment, the lateral direction 22 faces (e.g., points) out of the display (e.g., page). The coordinate system should be understood to move with the ride vehicle 14 as it tilts up, down, and side to side while traveling along the ride path 16. Further, the coordinate system is used for clarity and not intended to limit the claimed subject matter.

The ride vehicle 14 may accommodate the passenger 12 by providing a seat 32 that may extend along the lateral direction 22 to accommodate additional passengers 12. That is, the ride vehicle 14 may accommodate more passengers if the ride vehicle 14 is made wider (e.g., in the lateral direction 22). For example, although the illustrated embodiment shows one passenger 12, more passengers may be able to sit on seat 32 if the ride vehicle 14 is made wider.

The restraining system 18 contacts (e.g., secures) the one or more passengers 12 within the ride vehicle 14. The restraining system 18 includes an arm 23 pivotally attached (e.g., via a pivot system 34) to a floor 33 of the ride vehicle 14. The pivot system 34 may include a pivot block 35 (e.g., a clevis) with an opening configured to receive the arm 23 and a hole configured to receive a pivot pin 36 (e.g., a bolt, a screw, or any other pivot member). In an embodiment, the pivot block 35 may include two members 37 and 39, defining the opening, each member 37 and 39 having a hole that may receive the pivot pin 36. The two members 37 and 39 that make the pivot block 35 may be erected out of the floor 33 of the ride vehicle spaced apart along the lateral direction 22, such that the spacing may enable for a first end 25 of the arm 23 to be inserted into the opening. Furthermore, the arm 23 may include a hole on the first end 25 such that the hole may receive pivot pin 36 thereby pivotally coupling the arm 23 to the ride vehicle 14. Although an embodiment of the pivot system 34 is discussed above, the pivot system 34 may include any features that may facilitate the pivotal attachment of the arm 23 to the ride vehicle 14.

The arm 23 and the restraining system 18 may rotate about the pivot pin 36 in a direction 24 (e.g., along the plane formed by the direction of travel 20 of the ride vehicle 14 and the upward direction 21). In an embodiment, the arm 23 may rotate along direction 24 until the restraining system 18 comes into contact with the front of the interior of the ride vehicle 14 at one end. Further, the arm 23 may rotate along direction 24 about the pivot pin 26 until the restraining system 18 comes into contact with the passenger 12 at a second end 27. For example, the arm 23 may rotate about pivot pin 36 in direction 24 until a cummerbund 26 of the restraining system 18 comes into contact with the passenger 12. In an embodiment, the arm 23 may rotate about the pivot pin 36, while the cummerbund 26 remains stationary.

In an embodiment, a surface of the cummerbund 26 may be oriented along the lateral direction 22 and attached to a second end 27 of the arm 23. In an embodiment, the cummerbund 26 may include a padded, rectangular prism-shaped object. As illustrated, the cummerbund 26 may be positioned such that one surface of the cummerbund 26 is substantially perpendicular to the arm 23. Furthermore, in an embodiment, the cummerbund 26 may rotate about the second end 27 of the arm 23 in direction 28 (e.g., along the plane formed by the direction of travel 20 and the upward direction 21). In an embodiment, the cummerbund 26 may move (e.g., rotate in direction 28 and/or translate along linear direction 30) while the arm 23 remains stationary. As illustrated, in an embodiment, the cummerbund 26 may translate along a linear trajectory along linear direction 30. In the illustrated embodiment, direction 30 is parallel to a plane 31 through the middle of the cummerbund, along the length of a slot 38. In an embodiment, direction 30 may be substantially perpendicular to the length L of the arm 23.

The cummerbund 26 may be adjusted (e.g., rotated in direction 28 and translated along linear direction 30) to accommodate the passenger 12, expanding the range of passengers 12 that the restraining system may simultaneously accommodate. That is, depending on the size of the passenger 12, the restraining system 18 may be modified to contact (e.g., secure or restrain) the passenger 12 to the ride vehicle 14. Once the passenger 12 is situated inside the ride vehicle, the arm 23 may rotate about the pin 36 in direction 24 as a course adjustment. The cummerbund 26 may then translate in direction 30 and/or rotate about the second end 27 of the arm 23 in direction 28 as a fine adjustment. For example for a larger passenger 12 the arm 23 may rotate along direction 24 until secured to the lap (e.g., lower torso or anywhere on the body) of the passenger to the ride vehicle 14. Since the passenger is relatively larger, the cummerbund 26 may not need to translate along direction 30 to further secure the passenger 12 to the seat 32 of the ride vehicle 14.

Figure 3:
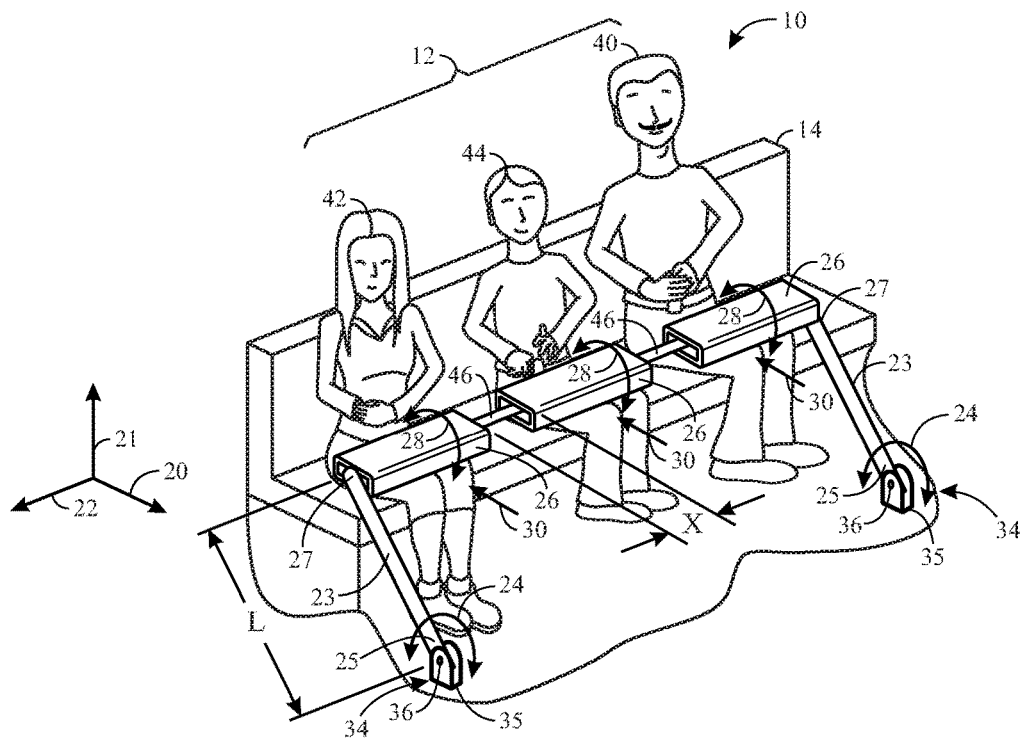
FIG. 3 is a perspective view of an embodiment of the ride vehicle of FIG. 2, in accordance with aspects of the present disclosure.

FIG. 3 is a perspective view of an embodiment of the ride vehicle 14 of the ride system 10. As illustrated, the ride vehicle 14 may accommodate a first passenger 40, a second passenger 42, and a third passenger 44, such that the first passenger 40 is larger than the second passenger 42, who in turn, is larger than the third passenger 44. As such, the restraining system 18 may accommodate one or more passengers 12 of varying sizes. For context, the passengers 12 are facing the direction of travel 20.

In an embodiment, the restraining system 18 includes three cummerbunds 26 that are attached to the lap bar 46. The lap bar may be oriented along the lateral direction 22 and attached to the distal ends 27 of the arms 23 (e.g., via welding, riveting, brazing, etc.) of the restraining system 18 at the lateral ends (e.g., along the outermost ends along lateral direction 22) of the lap bar 46.

Alternatively, in an embodiment, the lap bar 46 may be one solid bar, such that the arms 23 make up the side portions (e.g., members) of the lap bar 46 that are pivotally attached to the ride vehicle 14. As mentioned above, the arms 23 are pivotally attached to the pivot system 34, such that both the pivot block 35 of the pivot system 34 and the arms 23 may include apertures (e.g., holes) that may receive pivot pin 36. In an embodiment, the lap bar 46 may rotate about the pivot pin 36, while the one or more cummerbunds 26 remain stationary relative to the lap bar 46 as a coarse adjustment. The cummerbund 26 may then move (e.g., rotate in direction 28 and/or translate along linear direction 30) while the arm 23 remains stationary as a fine adjustment.

For example, the arms 23 (or the lap bar 46) may rotate about the pivot screw 36 along the direction 24 until the cummerbunds 26 come into contact with one of the passengers 12 (e.g., passenger 40). Since the arms 23 are coupled to the lap bar 46, in an embodiment, the two arms 23 may rotate about the pivot pin 36 until the cummerbund 26 come into contact with one of the passengers 12 (e.g., passenger 40). The other two cummerbunds 26 may then rotate (e.g., in direction 28) and/or translate (e.g., in direction 30) about the lap bar 46 until each of the cummerbunds 26 comes into contact with its respective passenger (e.g., passengers 42 and 44).

Furthermore, each of the three cummerbunds 26 in the illustrated embodiment are spaced apart from each other a distance X. The distance X may be any suitable distance. For example, for wider ride vehicles 14, the distance X between cummerbunds 6 may be greater than that for more narrow ride vehicles. It should be noted that each of the three cummerbunds 26 may rotate about the lap bar 46 in direction 28 independent of one another. Furthermore, the cummerbunds 26 may each independently translate along direction 30. For example, after the arms 23 are rotated about pivot pin 36 and a cummerbund 26 comes in contact with one of the passengers 12 (e.g., passenger 40 since he is the largest), the other cummerbunds 26 (e.g., the cummerbunds 26 corresponding to the second passenger 42 and the third passenger 44) may be adjusted (e.g., rotated in direction 28 and/or translated in direction 30) to further secure the other passengers 12 (e.g., the second passenger 42 and the third passenger 44).

Figure 4:
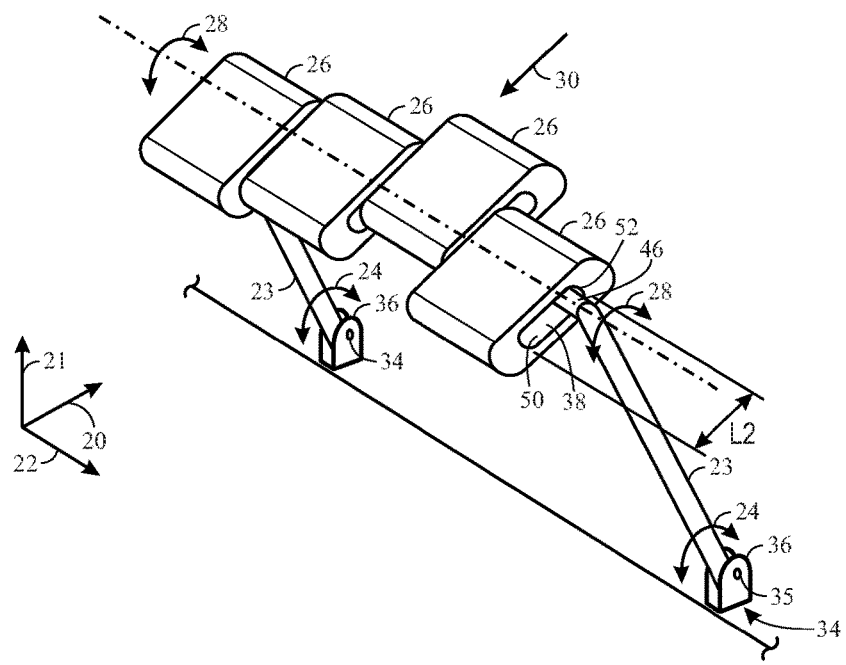
FIG. 4 is a perspective view of an embodiment of a restraining system of the ride vehicle of FIG. 2, in accordance with aspects of the present disclosure.

FIG. 4 is a perspective view of an embodiment of the restraining system of the ride system 10. The restraining system includes four cummerbunds 26, but, as mentioned above, the restraining system may include any number of cummerbunds 26.

As illustrated, each of the cummerbunds 26 include a slot 38 through which the lap bar 46 extends. In an embodiment, the cummerbund 26 may include two slots 38, one on each of the lateral surfaces of the cummerbund 26. In an embodiment, the slot 38 may extend through the cummerbund 26 along the lateral direction 22 to allow the lap bar 46 to traverse the slot 38 of the cummerbund 26 along the lateral direction 22. The slot 38 of the cummerbund 26 has a length L2. L2 is oriented substantially parallel to direction 30 and may be any suitable distance for adjusting the cummerbund 26 along direction 30.

Furthermore, as illustrated, each of the four cummerbunds 26 may independently translate along direction 30. That is, each of the cummerbunds 26 may translate along linear direction 30 by translating along distance L2 of the slot 38 to accommodate ride passengers 12 of varying sizes. In an embodiment, a ratcheting system may facilitate the movement (e.g., translation along direction 30 or rotation in direction 28) of the cummerbund 26. In an embodiment, an internal gear system may facilitate the movement (e.g., translation along direction 30 or rotation in direction 28) of the cummerbund 26 by allowing for grooves on the lap bar 46 to engage with an internal gear system of the cummerbund 26. Furthermore, in an embodiment, a hydraulic system may facilitate the movement (e.g., translation along direction 30 or rotation in direction 28) of the cummerbund 26.

For example, in an embodiment, when ride passengers 12 enter the ride vehicle 14, the restraining system may be positioned such that the arms 23 are retracted (e.g., parallel to the upward direction 21) to allow for the passenger 12 to enter the ride vehicle 14. Furthermore, the cummerbunds 26 may be retracted (e.g., positioned such that the lap bar 46 may be disposed at a first end 50 of the slot 38. After the passengers 12 have been seated, the lap bar 46 (and arms 23) may rotate along direction 24 about pivot pin 36 until one of the cummerbunds 26 comes into contact with one of the (e.g., seated) passengers 12 in the row of the ride vehicle 14.

In an embodiment, the lap bar 46 may stop rotating once a cummerbund 26 comes into contact with the (e.g., largest) passenger 12, thereby initially leaving the other (e.g., smaller) passengers 12 not secured. The cummerbunds 26 may then rotate in direction 28 and/or translate in direction 30 until each of the cummerbunds 26 come into contact with their respective passengers 30. In an embodiment, the cummerbunds 26 may translate anywhere between the first end 50 of the slot 38 and the second end 52 of the slot 38, depending on the size of the passenger 12. Furthermore, the cummerbunds 26 may be independently rotated along direction 28 to further secure the passengers 12.

Figure 5:
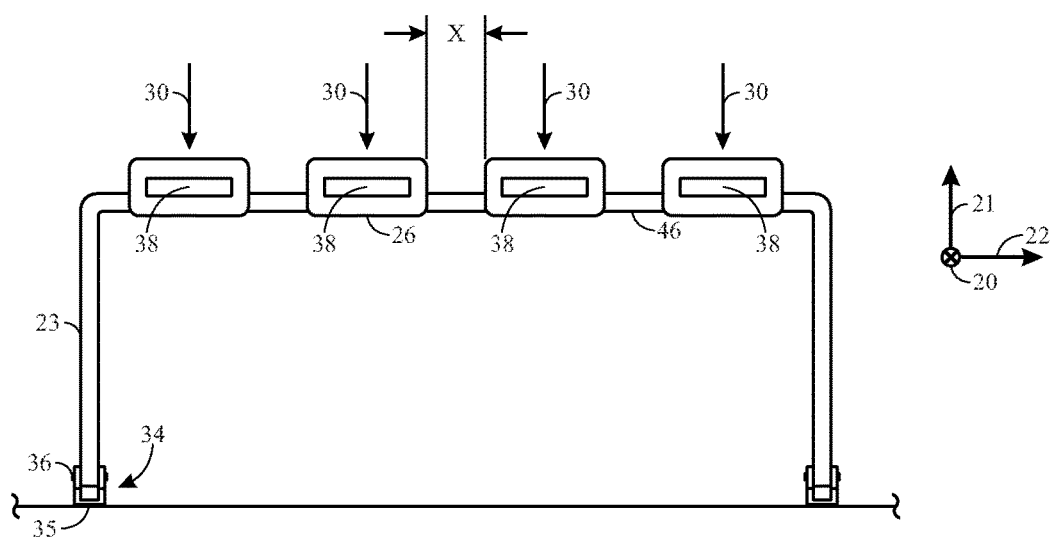
FIG. 5 is a rear view of an embodiment of the restraining system of FIG. 4, in accordance with aspects of the present disclosure.

FIG. 5 is a rear view of an embodiment of the restraining system 18 of FIG. 4, in accordance with aspects of the present disclosure. Specifically, the restraining system 18 includes four cummerbunds 26 which may each independently translate along direction 30 to, for example, accommodate four ride passengers 12 of different sizes. The cummerbund 26 may be spaced apart from another cummerbund 26 by distance X. Distance X may be 10 centimeters (cm), 25 cm, 100 cm, 1 meter (m), or any suitable distance. Furthermore, the lap bar 46 may rotate about the axis of the pivot pin 36, which may help pivotally fix the lap bar 46 to the pivot block 35.

Figure 6:
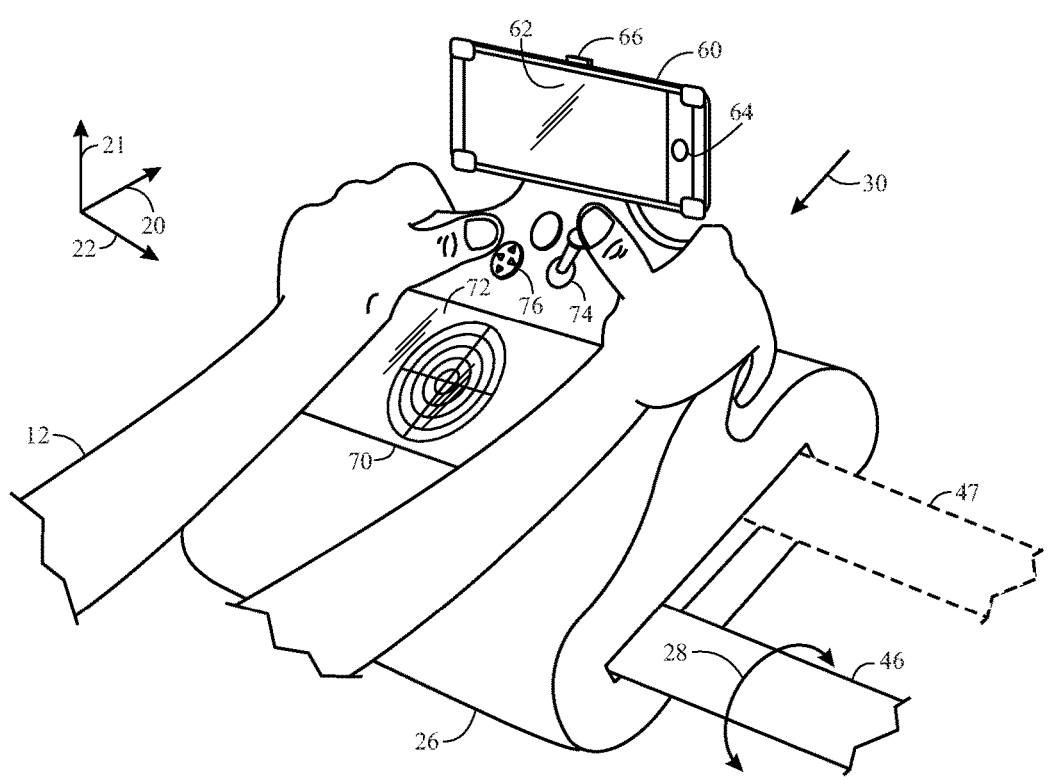
FIG. 6 is a perspective view of an embodiment of the cummerbund of the restraining system of FIG. 4, in accordance with aspects of the present disclosure.

FIG. 6 is a perspective view of an embodiment of the cummerbund 26 of the restraining system 18. As illustrated, the cummerbund 26 may include various interactive features that may enhance the experience while riding the ride vehicle 14. That is, the cummerbund 26 may secure the passenger 12, while providing en enhanced entertainment experience with the aid of its various interactive features.

As illustrated, the cummerbund 26 may include a first display system 60 that may include a screen 62 that may display game options via a graphical user interface (GUI), that the passenger 12 may be able to choose from and engage with (e.g., play) the games. The display system 60 may display the game options via a screen 62 that may include liquid crystal display (LCD), an electroluminescent display (ELD), a cathode ray tube display (CRT), and/or a light emitting diode (LED) display, among many other display options for relaying information to a passenger 12. Furthermore, the first display system 60 may include arrow keys 64 that may enable the passenger to move between game options. The first display system 60 may also include a power button 66 that may be pressed to send a signal indicative of turning on (or off) the first display system 60. In an embodiment, the display system 60 may be a part of the cummerbund 26. Furthermore, the cummerbund may include a mount configured to support a passenger's mobile device (e.g., smart phone, tablet, e-reader, etc.). In such an embodiment, the ride system 10 may connect to the mobile device via a wired or wireless (e.g., Wi-Fi, Bluetooth, Near Field Communication (NFC)) connection.

Furthermore, the cummerbund 26 may include a second display system 70 that may display, via the screen 72, the game selected from the first display system 60. As such, in an embodiment, the second display system 70 may include a cursor 74 for navigating and/or providing direction inputs to the game displayed on the screen 72. Furthermore, the second display system 70 may include an array of buttons 76 to facilitate sending inputs to the game with which the passenger 12 may engage while riding in the ride vehicle 14.

While the illustrated embodiment of the cummerbund 26 of FIGS. 5 and 6 is discussed with regards to a two screen system for selecting games from a list of game options, it should be understood that the cummerbund 26 may include additional entertainment features. For example, the cummerbund 26 may include a display that shows a perspective view captured by external cameras of the moving ride vehicle 14 and its passengers 12 while the ride vehicle is in operation. In an embodiment, the screens may display the view of a camera positioned in the front of the ride vehicle. Indeed, the cummerbund 26 may include any number of features that the passenger 12 may interact with and/or enhance the ride experience of the passenger 12.

Figure 7:
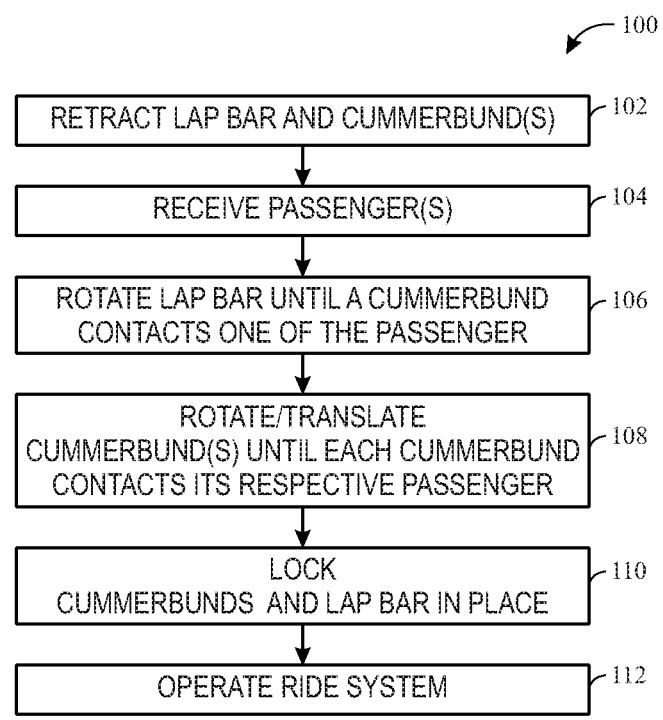
FIG. 7 is a flow diagram of a process whereby the cummerbund and a lap bar of the restraining system of FIG. 4 are locked in place, in accordance with aspects of the present disclosure.

FIG. 7 is a flow diagram 100 of a process whereby the cummerbund 26 and a lap bar 46 of the restraining system 18 of FIG. 4 are locked in place, in accordance with aspects of the present disclosure. Prior to receiving the passenger(s) 12, the restraining system 18 may be in an unlocked state to facilitate the ingression of the passenger(s) into the ride vehicle 14. As such, the lap bar and cummerbund(s) of the restraining system 18 may retract (process block 102). After the restraining system 18 (e.g., the lap bar 46 and cummerbund 26) retract, the restraining system 18 may receive one or more passengers 12 (process block 104). For example, for a ride vehicle with four cummerbunds 26, the ride vehicle may receive four passengers 12 (e.g., one passenger 12 for every cummerbund 26). In an embodiment, receiving passenger(s) may include allowing the passengers to sit on seat 32 of the ride vehicle 14.

After the ride vehicle receives the passenger(s), the restraining system may be configured to rotate the lap bar 46 (e.g., about pivot pin 36) until the cummerbund 26 contacts one of the passengers 12 (process block 106). In some instances, the lap bar 46 may rotate until the cummerbund comes in contact with the largest passenger. The rotation of the lap bar 46 may be a coarse adjustment of the restraining system 18. After the lap bar 46 contacts one of the passengers 12, the (e.g., disengaged) cummerbund(s) 26 may each be rotated (e.g., along direction 28) or translated (e.g., along direction 30) until each cummerbund 26 contacts its respective passenger 12 (process block 108). As such, the movement of the cummerbund 26 may serve as a fine adjustment of the restraining system 18. In some instances, the cummerbund 26 may translate a longer distance (e.g., L2 along direction 30) for a passenger that is smaller.

After the cummerbund(s) 26 contact respective passengers 12, the cummerbunds 26 and the lap bar 46 of the restraining system 18 may be locked into place (process block 110). In an embodiment, the restraining system 18 may include a sensor that may retrieve data indicative of whether its respective cummerbund 26 is in contact with (e.g., the lap of) a passenger to determine whether the restraining system is in a locked state. In other words, a sensor may facilitate determining whether the passengers 12 are secured to the ride vehicle 14 via the restraining system 18. For example, the sensor, may be a pressure sensor that will relay pressure information to amusement park operators. That is, when the sensor receives pressure information that is below a certain threshold, indicating that the cummerbund is not exerting a pressure to secure its corresponding passenger 12, the information may be communicated to a park attendant. Furthermore, the sensor may be an infrared sensors that identify the cummerbund as unlocked if a passenger 12 is not secured to the ride vehicle 14. Any suitable method of determining whether the cummerbund is adequately locked (e.g., such that the restraining system 18 secures a passenger 12 to the ride vehicle 12) may be used. After the cummerbund 26 and the lap bar 46 of the restraining system have been locked in place, the ride system 10 may begin operating (process block 112). In an embodiment, operating the ride system 10 may include enabling the ride vehicle 14 to travel along the ride path 16.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:
1. A system, comprising:
a first cummerbund comprising a slot; and
a lap bar configured to couple to first and second pivot points and to rotate in a first circumferential direction about the first and second pivot points; and
wherein the lap bar extends through the slot of the first cummerbund, wherein the first cummerbund is configured to translate in a first lateral direction relative to the lap bar to adjust a position of the lap bar within the slot, and wherein the first lateral direction is oriented substantially tangential to the first circumferential direction.

2. The system of claim 1, wherein the first cummerbund is configured to rotate about the lap bar in a second circumferential direction.

3. The system of claim 2, wherein the first cummerbund is configured to rotate in the second circumferential direction about a portion of the slot in contact with the lap bar, wherein the first cummerbund is configured to rotate in the second circumferential direction until the first cummerbund contacts a passenger.

4. The system of claim 2, comprising a second cummerbund configured to translate and rotate independently from the first cummerbund in a third circumferential direction and a second lateral direction, respectively.

5. The system of claim 1, wherein the first cummerbund comprises a display configured to present a graphical user interface (GUI).

6. The system of claim 5, wherein the GUI presented by the display is configured to present an interactive game, a video, a recording, or any combination thereof, based on a selection made via the GUI.

7. The system of claim 6, wherein the cummerbund comprises an array of buttons configured to generate a signal indicative of the selection made via the GUI.

8. The system of claim 1, wherein the first and second pivot points are positioned on a ride vehicle.

9. The system of claim 1, wherein cummerbund is padded.

10. The system of claim 1, wherein the first cummerbund is configured to remain stationary relative to the lap bar when the lap bar rotates in the first circumferential direction about the first and second pivot points.

11. The system of claim 1, wherein the lap bar is configured to remain stationary when the first cummerbund translates in the first lateral direction.

12. The system of claim 1, wherein the first cummerbund is configured to translate in the first lateral direction a length substantially equal to a length of the slot.

13. The system of claim 1, wherein the lap bar is configured to rotate in the first circumferential direction between a first position and a second position, wherein in the first position, the lap bar is rotated about the first and second pivot points away from a passenger, and wherein in the second position, the lap bar is rotated about the first and second pivot points such that the first cummerbund contacts the passenger.

14. The system of claim 1, wherein the lap bar and the first cummerbund are configured to be locked in position during operation of a ride vehicle.

15. The system of claim 1, comprising a ratcheting system configured to allow the cummerbund to translate along the first lateral direction or rotate about the lap bar in a second circumferential direction.

16. A ride system, comprising:
a ride vehicle, comprising:
a lap bar configured to couple to first and second pivot points of the ride vehicle, wherein the lap bar is configured to rotate in a first circumferential direction about the first and second pivot points; and
a plurality of cummerbunds disposed about the lap bar, wherein each cummerbund comprises a slot; and
wherein the lap bar extends through the slot of each cummerbund of the plurality of cummerbunds, wherein each cummerbund of the plurality of cummerbunds is configured to translate independently of one another in a first lateral direction relative to the lap bar to adjust a corresponding position of the lap bar within the slot, and wherein the first lateral direction is oriented substantially tangential to the first circumferential direction.

17. The ride system of claim 16, wherein each cummerbund of the plurality of cummerbunds is configured to independently rotate about the lap bar in a second circumferential direction.

18. The ride system of claim 16, wherein each cummerbund of the plurality of cummerbunds comprises a display configured to present a graphical user interface (GUI).

19. A ride vehicle, comprising:
a cummerbund comprising a slot, wherein the cummerbund is configured to contact a ride passenger; and
a lap bar configured to couple to first and second pivot points of the ride vehicle and to rotate in a first circumferential direction about the first and second pivot points between a first position and a second position; and
wherein the lap bar extends through the slot of the cummerbund, wherein the cummerbund is configure to translate in a lateral direction relative to the lap bar between a third position and a fourth position, and wherein the lateral direction is oriented substantially tangential to the first circumferential direction.

20. The ride vehicle of claim 19, wherein the first position comprises a locked position, wherein the cummerbund is in contact with the ride passenger, and wherein the second position comprises an unlocked position, wherein the cummerbund is translated away from the ride passenger to facilitate passenger ingression into the ride vehicle and passenger egression out of the ride vehicle.

\* \* \* \* \*